March 13, 1956 M. G. BEKKER 2,738,237
TRACTOR CLEAT AND TRACK
Filed Sept. 10, 1952 2 Sheets-Sheet 1

INVENTOR
Mieczyslaw G. Bekker

BY Bailey, Stephens & Huettig
ATTORNEYS

March 13, 1956  M. G. BEKKER  2,738,237
TRACTOR CLEAT AND TRACK

Filed Sept. 10, 1952  2 Sheets-Sheet 2

INVENTOR
Mieczyslaw G. Bekker

BY Bailey, Stephens & Huettig
ATTORNEYS

United States Patent Office 2,738,237
Patented Mar. 13, 1956

2,738,237

TRACTOR CLEAT AND TRACK

Mieczyslaw G. Bekker, Washington, D. C., assignor to Her Majesty the Queen in the Right of Canada as represented by the Minister of National Defence, Ottawa, Ontario, Canada Application September 10, 1952, Serial No. 308,801

7 Claims. (Cl. 305—10)

This invention relates to endless tracks for vehicles. In particular the invention is directed to the construction of the cleat or grouser, and its attachment to an endless connecting member. The objects of the invention are to produce a cleat of better performance than cleats known heretofore, and to produce a track in which the traction effort of the cleat is particularly effective in soft soil conditions.

In general, these objects are accomplished by forming a cleat with a horizontal flange and a vertical flange. The horizontal flange has one or more channel shaped depressions formed therein in which an endless connecting member is seated and secured. This member does not fill the channel shaped section, and the unfilled portion in effect provides a groove which serves as a guideway as the cleat passes around the wheels of the vehicle. Ground engaging members secured to said connecting member in the reaches between cleats, keep the cleats from penetrating the ground under firm soil conditions.

The means by which the objects of the invention are obtained are described more fully with reference to the accompanying drawings in which.

Figure 1:
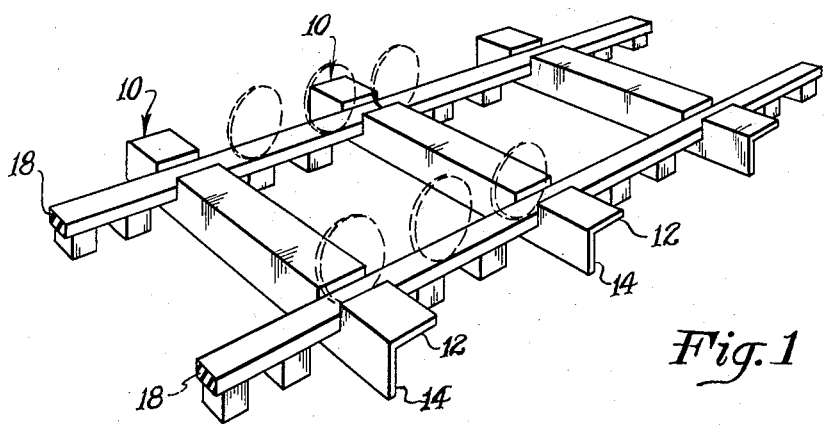
Figure 1 is a perspective view of a track constructed according to the invention.
Figure 2:
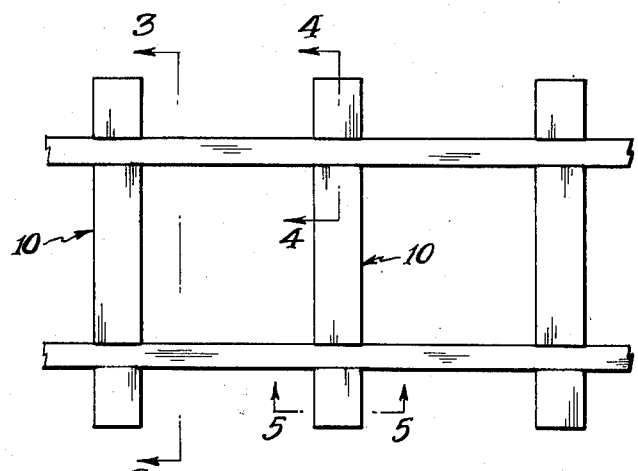
Figure 2 is a plan view of Figure 1.
Figure 3:
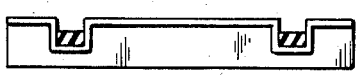
Figure 3 is a cross-sectional view on the line 3—3 of Figure 2.
Figure 4:
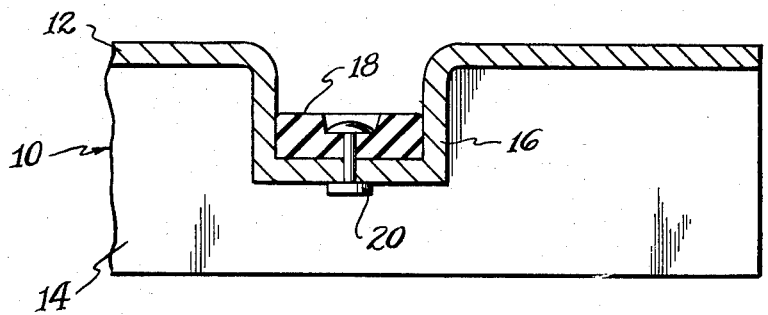
Figure 4 is an enlarged cross-sectional view on the line 4—4 of Figure 2.

Each cleat 10 is composed of an angle member having a horizontal flange 12 and a vertical flange 14. The horizontal flange has a channel shaped portion 16 extending beneath it approximately half the depth of flange 14. The portion of the flange 14 adjacent the channel shaped portion is cut away to form a clear opening through the cleat. In practice, a plurality of channel shaped portions are formed, and while two such portions are shown for each cleat in the drawings, it is to be understood that any desired number can be provided. The cleats are separated to leave clear spaces between the horizontal flanges, and are joined by one or more connecting members. The endless connecting member 18 is seated in channel shaped portion 16 and attached thereto as by a rivet 20. In the form illustrated, the endless member is composed of rubber, but it may be a steel link chain, and in which each cleat may be a chain link. This member 18 fills but approximately half of the box-like section 16, and the space above band 18 is available as a guide groove to position the cleats with respect to the boogie or idler wheels under which the track travels as indicated by the dotted circles.

Figure 5:
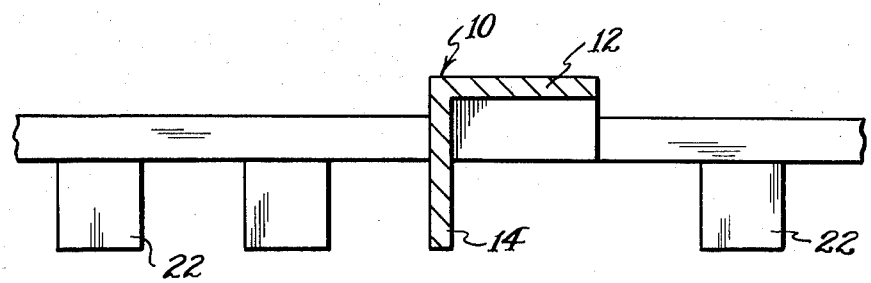
Figure 5 is an enlarged cross-sectional view on the line 5—5 of Figure 2.

Attached to the lower side of belt 18 are spaced ground engaging blocks 22, these blocks extending downwardly to the plane of the lower edge of flange 14. The purpose of these blocks is to support the belt 18 intermediate the spaced cleats 10. As seen in Figures 1 and 5 one or more of the blocks 22 are attached to the flexible connecting member 18. The effect of this is in that each section of member 18 attached to either a cleat 10 or a block 22 can be considered as a link in a chain, thus permitting cleats 10 to be rather widely separated from each other, while adequate ground support is supplied by blocks 22. At the same time the pitch, or length of the individual link sections of member 18, is kept small so that member 22 can go around a driving sprocket wheel of practical size.

In operation, when the vehicle is traveling on firm soil, or upon a hard road, the principal support for the vehicle is taken by blocks 22, and the cleats 10 have little or no function. When the vehicle encounters soft ground conditions, the blocks 22 will sink into the ground, and the flange 14 engages the ground to provide traction for the vehicle. The structure differs from prior concepts of tracks inasmuch as no attempt is made to provide sufficient bearing area through the horizontal flanges 12 so as to, in effect, give full floatation to a vehicle when operating in soft soil, the flanges 12 being spaced. The structure instead operates on the principle that full traction must be obtained by the flanges 14 under soft soil conditions, and it does not matter if the entire cleat 10 is submerged beneath the surface. The manner of spacing the cleats is disclosed in my co-pending application Serial No. 175,767, filed July 25, 1950, now Patent No. 2,685,481, for Spaced Link Track, and in my co-pending application for Tractor Track, S. N. 308,802, filed September 10, 1952, now abandoned and replaced by continuation-in-part application S. N. 376,657, filed August 26, 1953, now Pat. No. 2,708,608.

Figure 6:
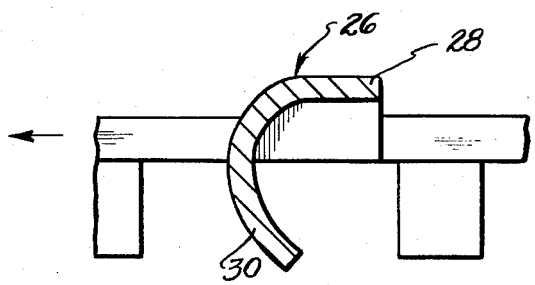
Figure 6 is a view similar to Figure 5 and showing a modified form of cleat.

In Figure 6 a modified cleat 26 has a horizontal flange 28 and a curved vertical flange 20. The curving of the flange 30 results in curved connection between flanges 28 and 30 rather than the right angle bend as shown in cleat 10, and inclines the flange to the vertical. This curved connection produces a better rigidity of the vertical flange. The inclined position of the vertical flange improves its ability to dig into the ground, and increases the tractive effort.

Figure 7:
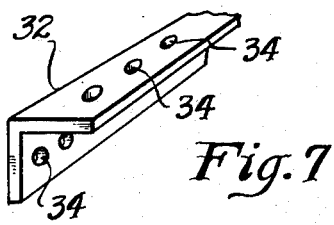
Figure 7 is an isometric view of a modified cleat.

Figure 7 shows a cleat modified to take advantage of the so-called "arching effect" in soil mechanics. Following the consideration of this effect as set forth in the publication "Theoretical Soil Mechanics" by K. Terzaghi, pages 66 to 76, published by John Wiley and Sons, New York City, 1944, when a plate with a hole in it is pushed against the ground, the earth bridging the opening acts along with the earth under the plate as a bearing area, and no loss of bearing surface occurs by reason of the hole. Accordingly, in Figure 7 the cleat 32 is provided with apertures 34 in both the horizontal and vertical flanges, the size of the apertures being calculated as described in the aforesaid publication. This serves to lighten the cleat without loss of its bearing and tractive qualities, and without serious effect on its mechanical strength. These apertures, of course, can be applied to the cleats of Figures 1 and 6.

Having now described the means by which the objects of the invention are obtained,

I claim:

1. A cleat for an endless tractor track comprising an angle iron having a vertical flange and a horizontal flange, and a pair of spaced channel shaped sections extending entirely beneath said horizontal flange and through said vertical flange.

2. A cleat as in claim 1, said vertical flange being curved in vertical cross-section.

3. A cleat as in claim 1, further comprising said channel sections extending to about the midpoint of the height of said vertical flange.

4. A tractor track comprising cleats each being an angle iron having a vertical flange, a horizontal flange and an open channel shaped section extending entirely beneath said horizontal flange and through said vertical flange, and an endless connecting member secured, respectively, in the channel shaped sections of said cleats.

5. A tractor track as in claim 4, further comprising said member only partially filling said channel section whereby a guiding groove is provided for the tractor wheels.

6. A tractor track as in claim 4, further comprising the horizontal flanges of adjacent cleats being spaced with reaches of said connecting member extending across the spaces, and spaced ground engaging members secured to said connecting member along said reaches.

7. A tractor track comprising cleats each being an angle iron having a vertical flange and a horizontal flange, an endless flexible connecting member secured to said cleats, the horizontal flanges of adjacent cleats being spaced with reaches of said connecting member extending across the spaces, and spaced ground engaging track supporting members secured to said connecting member along said reaches, said supporting members extending at least to the plane of the lower edges of said vertical flanges.

References Cited in the file of this patent

UNITED STATES PATENTS

| | | |
|---|---|---|
| 1,308,153 | Wheat | July 1, 1919 |
| 1,398,890 | Coatsworth | Nov. 29, 1921 |
| 1,633,259 | Langenfeld | June 21, 1927 |
| 1,825,075 | Knox et al. | Sept. 29, 1931 |
| 2,412,122 | Campbell | Dec. 3, 1946 |
| 2,455,307 | Irvin | Nov. 30, 1948 |

FOREIGN PATENTS

| | | |
|---|---|---|
| 452,264 | Great Britain | Aug. 19, 1936 |
| 507,657 | Great Britain | June 20, 1939 |